United States Patent
Kroll

(10) Patent No.: US 6,744,152 B2
(45) Date of Patent: Jun. 1, 2004

(54) IMPLANTABLE CARDIOVERTER DEFIBRILLATOR WITH SWITCHABLE POWER SOURCE AND PATIENT WARNING SYSTEM CARDIAC DEVICE

(75) Inventor: Mark W. Kroll, Simi Valley, CA (US)

(73) Assignee: Pacesetter, Inc., Sylmar, CA (US)

( * ) Notice: Subject to any disclaimer, the term of this patent is extended or adjusted under 35 U.S.C. 154(b) by 241 days.

(21) Appl. No.: 10/084,521

(22) Filed: Feb. 25, 2002

(65) Prior Publication Data

US 2003/0160588 A1 Aug. 28, 2003

(51) Int. Cl.[7] .............................. H02J 7/00; H02J 9/00
(52) U.S. Cl. .............................. 307/66; 320/103; 607/5
(58) Field of Search ..................... 307/66, 64; 320/103; 607/5

(56) References Cited

U.S. PATENT DOCUMENTS

| | | | | |
|---|---|---|---|---|
| 5,591,211 A | | 1/1997 | Meltzer | 607/5 |
| 5,814,075 A | * | 9/1998 | Kroll | 607/5 |
| 5,957,956 A | * | 9/1999 | Kroll et al. | 607/5 |
| 6,074,775 A | | 6/2000 | Gartstein et al. | 429/53 |
| 6,118,248 A | | 9/2000 | Gartstein et al. | 320/107 |
| 6,163,131 A | | 12/2000 | Gartstein et al. | 320/118 |
| 6,420,852 B1 | * | 7/2002 | Sato | 320/134 |
| 6,549,807 B1 | * | 4/2003 | Kroll | 607/34 |
| 6,552,511 B1 | * | 4/2003 | Fayram | 320/103 |
| 2002/0001745 A1 | | 1/2002 | Garstein et al. | 429/61 |

FOREIGN PATENT DOCUMENTS

| | | | | |
|---|---|---|---|---|
| WO | WO 99/52163 | 10/1999 | | H01M/6/50 |
| WO | WO 99/52167 | 10/1999 | | H01M/10/42 |
| WO | WO 99/52170 | 10/1999 | | H01M/12/06 |

OTHER PUBLICATIONS

Naik, Ajay M., MD; et al., "Are Implantable Cardioverter Defibrillators Cost–Effective?", Clinical and Interventional Electrophysiology, vol. 2, pp: 341–345 (2000).

Larsen, Greg C., FACC, et al., "Cost–Effectiveness of the Implantable Cardioverter–Defibrillator: Effect of Improved Battery Life and Comparison with Amiodarone Therapy", JACC, vol. 19, No. 6, pp: 1323–1334 (May 1992).

Takeuchi, Esther Sans, et al., Lithium/Silver Vanadium Oxide Batteries for Implantable Defibrillators, PACE, vol. 11, Part II, pp: 2035–2039 (Nov. 1988).

Epstein, Andrew E., et al., "Failure of Elective Replacement Indicator to Predict End–of–Life of the Automatic Implantable Cardioverter–Defibrillator", PACE, vol. 11, pp: 569–574 (May 1988).

Aarons, Diana, et al., "Use of the Elective Replacement Indicator in Predicting Time of Automatic Implantable Cardioverter–Defibrillator Battery Depletion", PACE, vol. 12, pp: 1724–1728 (Nov. 1989).

Kindermann, Michael, et al., "Do Battery Depletion Indicators Reliably Predict the Need for Pulse Generator Replacement?", PACE, vol. 24, pp: 945–949 (Jun. 2001).

* cited by examiner

Primary Examiner—Gregory J. Toatley, Jr.

(57) ABSTRACT

A system and method are provided for using a multiple cell power supply in an implantable medical device such as an implantable cardioverter defibrillator. In a two-cell battery network, a higher energy density cell continuously charges a lower density cell, and the lower density cell provides the current needed for device functions. A current sensor detects the current flowing between the two cells. If the current deviates from an acceptable normal range, one battery cell is failing. The battery network is then reconfigured by opening and closing intervening switches such that the failing cell is eliminated and the remaining cell continues to power device functions. Upon eliminating a failing battery cell, a patient warning signal is issued.

31 Claims, 4 Drawing Sheets

IMPLANTABLE CARDIOVERTER DEFIBRILLATOR WITH SWITCHABLE POWER SOURCE AND PATIENT WARNING SYSTEM CARDIAC DEVICE

CROSS-REFERENCE TO RELATED APPLICATION

This application relates to copending U.S. patent application Ser. No. 09/545,044, filed Apr. 7, 2000, titled "Hybrid Battery Network for Implantable Medical Device" to Fayram, which is assigned to the same assignee as the present invention, and which is incorporated herein by reference.

FIELD OF THE INVENTION

The present invention relates generally to implantable medical devices possessing a multiple cell power source. More particularly, this invention relates to an implantable cardioverter defibrillator that provides charge monitoring of a multiple cell power source so that if the charge of a cell is depleted, a patient warning signal is provided and the power source circuitry is reconfigured to rely only on cells with an acceptable remaining charge.

BACKGROUND OF THE INVENTION

In the normal human heart, the sinus node, generally located near the junction of the superior vena cava and the right atrium, constitutes the primary natural pacemaker initiating rhythmic electrical excitation of the heart chambers. Disruption of the heart's natural pacemaker and conduction system, as a result of aging or disease, can be successfully treated using implantable cardiac simulation devices, including pacemakers and implantable cardioverter defibrillator. A pacemaker generally delivers rhythmic electrical pulses to the heart to maintain a normal rhythm in patients having bradycardia, which is too slow of heart rate, or other conduction abnormalities. An implantable cardioverter defibrillator, commonly referred to as an "ICD", is capable of recognizing tachycardia or fibrillation and delivering electrical therapy to terminate such arrhythmias. ICD's are often configured to also perform pacemaking functions as well.

Special difficulties arise in providing an adequate energy source for ICD's, particularly those that are also intended to perform pacemaking functions. Cardioversion-defibrillator typically requires a few high-power electrical shocks to be generated relatively infrequently. For cardioversion, the shocks are typically at about two joules. For defibrillation, the shocks are typically at about twenty joules. Pacemaking functions, in contrast, may require that numerous relatively low-power electrical shocks be generated frequently. Pacing shocks are typically on the order of micro-joules. Energy is also required to monitor the heart for the purposes of detecting when cardioversion, defibrillation or pacing is required. Monitoring causes a continuous low-power current draw of about ten microamperes.

Also, energy may be required to reform whatever capacitor is used in connection with delivering defibrillation shocks. In this regard, aluminum electrolytic capacitors, which are commonly employed, typically must be charged to full voltage every couple of months to prevent degradation. Whether energy is actually required to perform capacitor reformation depends upon whether the patient receives relatively frequent defibrillation shocks. The ICD's of patients that do not receive at least one defibrillation shock every month or two will require a periodic capacitor reformation cycle. The ICD's of patients that do receive at least one defibrillation shock every month or two, however, do not typically require capacitor reformation cycles because reformation is achieved automatically during the generation of the defibrillation shocks.

To accommodate these various energy requirements, some ICD designs employ two power cells, a high-power cell and a low-power cell. Exemplary high-power cells include manganese dioxide cells and silver vanadium oxide cells. Exemplary low-power cells include carbon monofluoride cells and lithium iodine cells. In one possible example, the high-power cell provides energy for capacitor reformation and for cardioverter defibrillator functions and the low-power cell provides energy for the pacemaking and monitoring functions. In other possible examples, the high-power cell provides energy for capacitor reformation, cardioverter defibrillator functions and pacemaking functions and the low-power cell provides energy only for the monitoring functions.

The simplest ICD devices having separate high-power and low-power cells performed only monitoring, pacing and defibrillation functions and were configured to always draw energy for defibrillation from the high-power cell and to always draw energy for pacing and monitoring from the low-power cell, i.e. the power cells are non-switchable. However, the actual energy drawn from the low- and high-power sources varies considerably from patient to patient. For example, some patients require frequent pacing but little or no defibrillation whereas other patients require relatively frequent defibrillation but little or no pacing. Still others require neither pacing nor defibrillation but merely require continuous monitoring.

As a result of the wide variations in actual energy usage, circumstances can arise within ICD's having non-switchable power sources wherein one power cell becomes quickly depleted thereby necessitating early replacement of the ICD even though the other power cell retains considerable energy and could otherwise continue to provide energy for the ICD. For example, circumstances can arise wherein the ICD must be replaced because the low-power cell has been depleted from frequent pacing or from a long period of continuous monitoring even though the high-power cell has abundant energy and could otherwise continue to power all ICD functions.

One design proposes a device that switches from the low-power cell to the high-power cell if the low-power cell becomes depleted, wherein energy for pacing and defibrillation is drawn from a silver vanadium oxide cell, and energy for monitoring is drawn from a lithium iodine cell. Thus, energy for monitoring is switched from the lithium iodine cell to the silver vanadium oxide cell if the lithium iodine cell becomes depleted.

Although this latter design represents an improvement over non-switchable systems, substantial room for further improvement remains. As an example, with that design, if the patient requires a considerable amount of pacing and a considerable amount of defibrillation therapy, the silver vanadium oxide cell will become quickly depleted, thereby necessitating early replacement of the device even though the lithium iodine cell retains considerable energy reserves.

In such circumstances, it would be preferable to switch the device, while the silver vanadium oxide cell still retains sufficient energy for defibrillation, to draw energy for the pacemaking functions from the lithium iodine cell to thereby slow the depletion of the silver vanadium oxide cell by more effectively using the remaining energy of the lithium iodine cell. However, this prior design does not provide for switching from the high-power cell to the low-power cell and thereby may result in a premature replacement of the ICD.

Moreover, even the manner by which this prior design operates to switch from the low-power cell to the high-power cell could be improved. In this regard, this prior design merely operates to determine whether the low-power cell has become completely depleted and, if so, switches completely and immediately to the high-power cell. Further improvement can be gained by gradually adjusting the relative amounts of energy drawn from the two power cells in an optimal manner.

In addition, in any battery-powered device, the device performance will eventually become compromised if one battery cell discharges below a functional level prior to device replacement. Particularly in the case of ICDs, such an event could be life-threatening to the patient. An elective or recommended replacement indicator provided by manufacturers of ICDs is used to indicate the recommended time for replacing the ICD. However, replacement indicators are not always accurate and have been found to underestimate the remaining battery life. While device replacement prior to the end of the battery life is crucial, improving the cost effectiveness of ICD therapy by extending the implant time is also a goal.

The cost effectiveness and safety of ICD therapy, therefore, can continue to be improved with improvements in battery technology. Hence, it would be desirable to provide a battery system that safely maximizes the implant time and that optimizes energy delivery from a power source to the ICD circuitry. Such capabilities would be desirable in an ICD regardless of the number of battery cells used or the battery chemistry implemented.

SUMMARY OF THE INVENTION

The present invention addresses these needs by providing an implantable cardioverter defibrillator (ICD) equipped with a multiple cell power source and switching circuitry for reconfiguring the power source when any cell charge precipitously decreases. The reconfigured power source selects the remaining cell or cells that retain an acceptable charge for powering monitoring and output functions of the ICD.

Furthermore the present invention provides that, upon detection of a reduced cell charge, a patient warning is issued to alert the patient that medical attention should be sought for determination of a safe device replacement time.

The foregoing and other features of the present invention are realized by providing an implantable, multichamber cardiac stimulation device equipped with pacing, cardioversion and defibrillation capabilities powered by a multiple cell power source. A preferred embodiment of the stimulation device includes a power source equipped with two batteries for powering the circuitry of the device, one battery having a higher resistance and greater energy density than the other battery; a control system for controlling the operation of the device; a set of leads that connects cardiac electrodes to the stimulation device for receiving cardiac signals and for delivering atrial and ventricular stimulation pulses; a set of sensing circuits comprised of sense amplifiers for sensing and amplifying the cardiac signals; a data acquisition system, such as an A/D converter, for sampling cardiac signals; and pulse generators for generating atrial and ventricular stimulation pulses.

The stimulation device further includes memory for storing operational parameters for the control system, such as stimulation parameter settings and timing intervals. The stimulation device also includes a telemetry circuit for communicating with an external programmer.

The power source is further equipped with switching circuitry such that battery cells may be selectively connected to the power source output for providing current to the sensing, output and control functions of the ICD. In a preferred embodiment, the lower energy density cell, preferably a lithium silver vanadium oxide cell, provides current flow to the circuitry of the stimulation device.

The higher energy density cell, preferably a lithium carbon monofluoride cell, provides current flow to the low density cell to maintain its charge. A current sensor provided between the high and low density cells detects if the current flow between the two cells deviates from a normal range. Upon detection of an unacceptable current flow, the control system opens or closes the appropriate switches such that the discharged cell is disconnected from the power supply output circuit The remaining cell continues to power all device functions.

The stimulation device is further provided with a patient warning system so that when a power cell is found by a control program to have a charge low enough to require reconfiguration of the power source circuitry, a low-battery warning signal is issued to the patient. The patient warning is preferably an audible buzzer or a twitch stimulation applied to excitable tissue surrounding the implanted device causing a sensation perceptible by the patient. The patient has been advised to seek medical attention upon perceiving the low-battery alarm such that an appropriate device replacement time may be scheduled.

The methods of the present invention thus improve the safety of the ICD by excluding a discharged power cell from the power supply circuitry so that remaining cells power all device functions adequately and by providing a patient warning of a low battery condition allowing the patient to seek medical attention well before device function becomes seriously impaired. The methods of the present invention may be advantageously applied using the most recent battery technology, which may use two or more cells of varying battery chemistries.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following description is of a best mode presently contemplated for practicing the invention. This description is not to be taken in a limiting sense but is made merely for the purpose of describing the general principles of the invention. In the description of the invention that follows, like numerals or reference designators will be used to refer to like parts or elements throughout. The present invention is directed at providing an improved switchable power supply and patient alarm in an implantable cardiac stimulating device possessing pacemaking, cardioversion and defibrillation capabilities.

Figure 1:
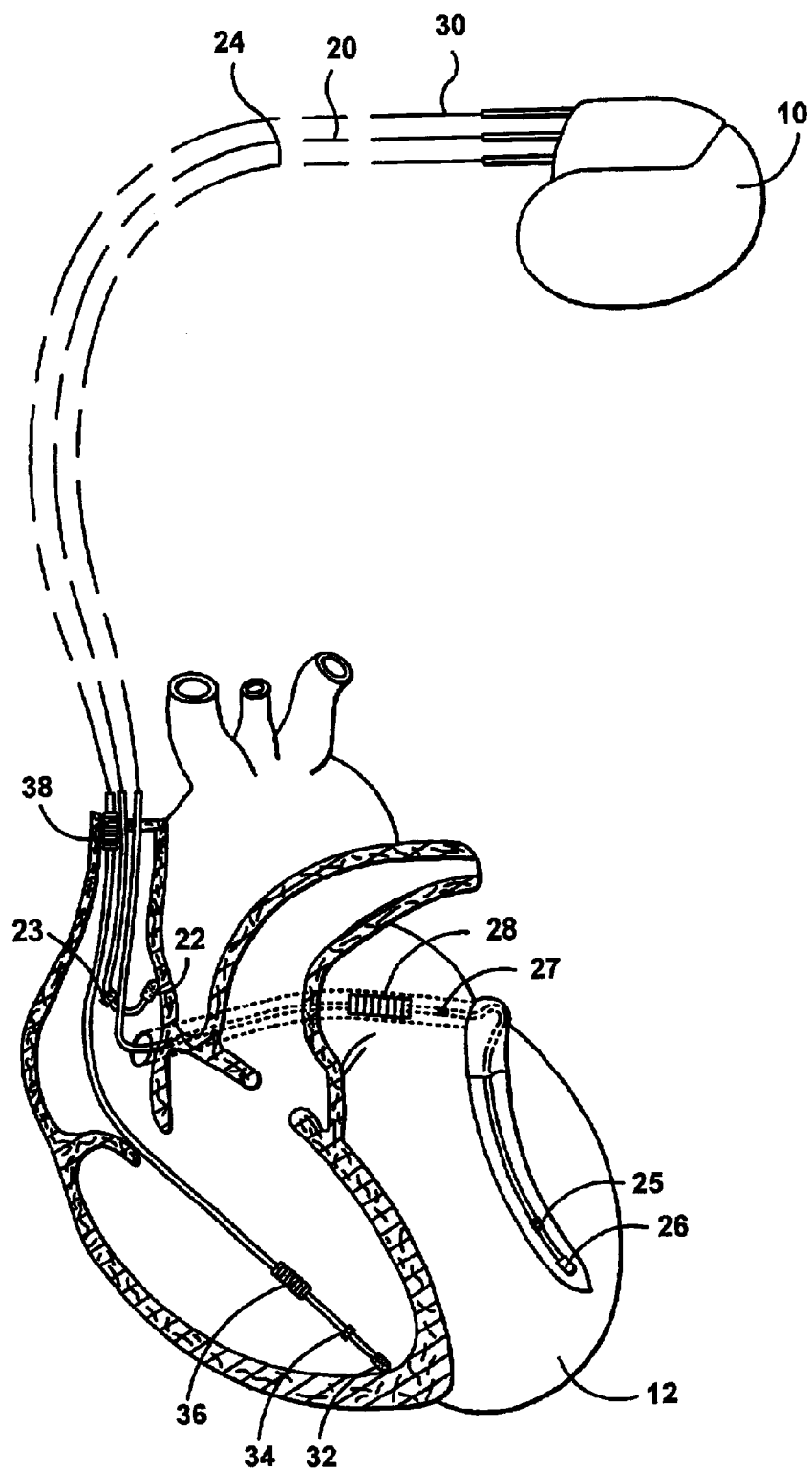
FIG. 1 is a simplified, partly cutaway view illustrating an implantable stimulation device in electrical communication with at least three leads implanted into a patients heart for delivering multi-chamber stimulation and shock therapy.
Figure 2:
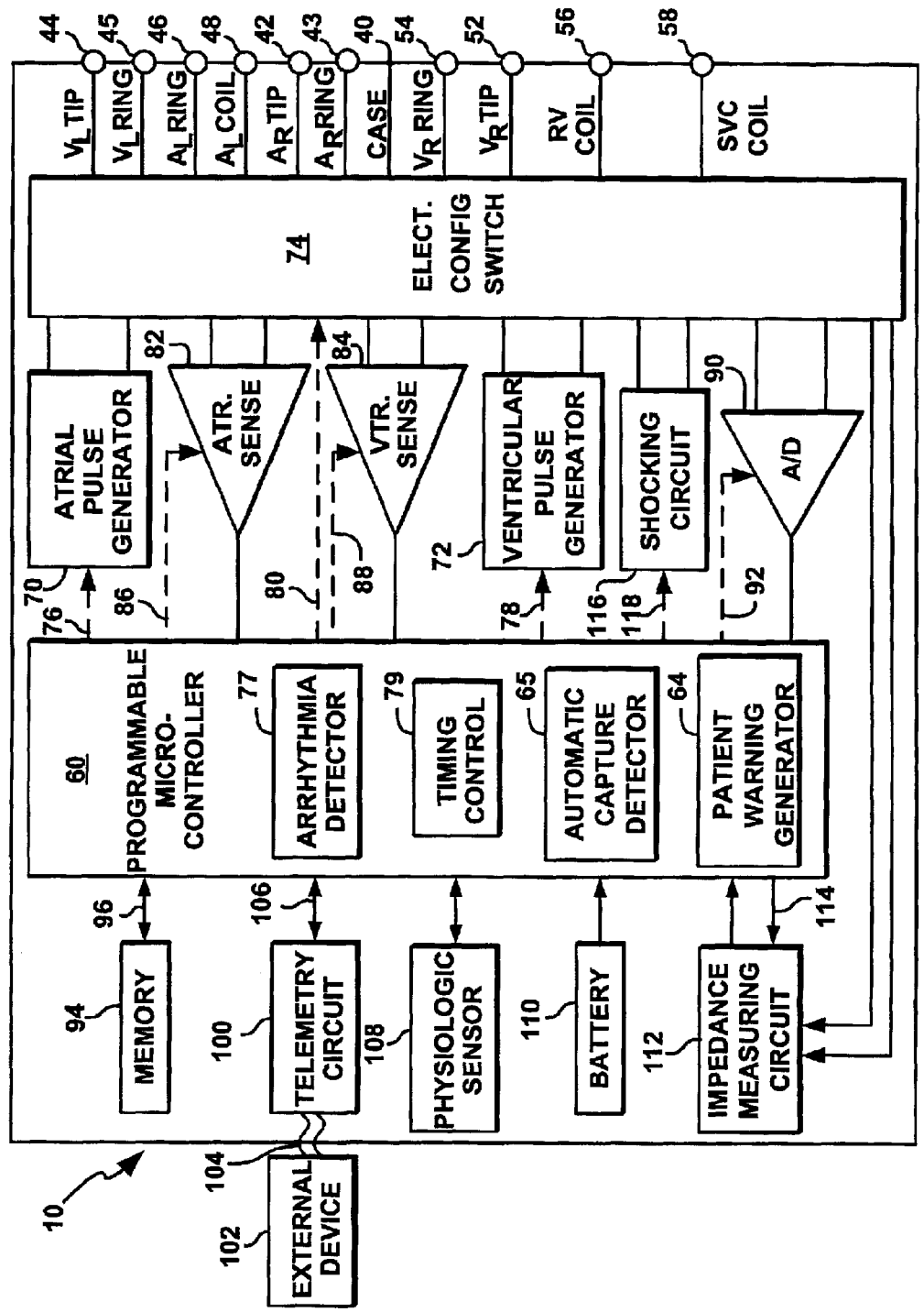
FIG. 2 is a functional block diagram of the multi-chamber implantable stimulation device of FIG. 1, illustrating the basic elements that provide pacing stimulation, cardioversion, and defibrillation in four chambers of the heart.

A cardiac stimulation device will thus be described in conjunction with FIGS. 1 and 2, in which the features included in the present invention could be implemented. It is recognized, however, that numerous variations of such a device exist in which the methods included in the present invention could be implemented without deviating from the scope of the present invention.

FIG. 1 illustrates a stimulation device 10 in electrical communication with a patient's heart 12 by way of three leads 20, 24 and 30 suitable for delivering multi-chamber stimulation and shock therapy. To sense atrial cardiac signals and to provide right atrial chamber stimulation therapy, the stimulation device 10 is coupled to an implantable right atrial lead 20 having at least an atrial tip electrode 22, which typically is implanted in the patient's right atrial appendage. The right atrial lead 20 may also have an atrial ring electrode 23 to allow bipolar stimulation or sensing in combination with the atrial tip electrode 22.

To sense the left atrial and ventricular cardiac signals and to provide left-chamber stimulation therapy, the stimulation device 10 is coupled to a "coronary sinus" lead 24 designed for placement in the "coronary sinus region" via the coronary sinus ostium so as to place a distal electrode adjacent to the left ventricle and additional electrode(s) adjacent to the left atrium. As used herein, the phrase "coronary sinus region" refers to the venous vasculature of the left ventricle, including any portion of the coronary sinus, great cardiac vein, left marginal vein, left posterior ventricular vein, middle cardiac vein, and/or small cardiac vein or any other cardiac vein accessible by the coronary sinus.

Accordingly, the coronary sinus lead 24 is designed to: receive atrial and ventricular cardiac signals; deliver left ventricular pacing therapy using at least a left ventricular tip electrode 26 for unipolar configurations or in combination with left ventricular ring electrode 25 for bipolar configurations; deliver left atrial pacing therapy using at least a left atrial ring electrode 27, and shocking therapy using at least a left atrial coil electrode 28.

The stimulation device 10 is also shown in electrical communication with the patient's heart 12 by way of an implantable right ventricular lead 30 having, in this embodiment, a right ventricular tip electrode 32, a right ventricular ring electrode 34, a right ventricular (RV) coil electrode 36, and a superior vena cava (SVC) coil electrode 38. Typically, the right ventricular lead 30 is transvenously inserted into the heart 12 so as to place the right ventricular tip electrode 32 in the right ventricular apex so that the RV coil electrode 36 will be positioned in the right ventricle and the SVC coil electrode 38 will be positioned in the right atrium and/or superior vena cava. Accordingly, the right ventricular lead 30 is capable of receiving cardiac signals, and delivering stimulation in the form of pacing and shock therapy to the right ventricle.

FIG. 2 illustrates a simplified block diagram of the multi-chamber implantable stimulation device 10, which is capable of treating both fast and slow arrhythmias with stimulation therapy, including cardioversion, defibrillation, and pacing stimulation. While a particular multi-chamber device is shown, this is for illustration purposes only, and one of skill in the art could readily duplicate, eliminate or disable the appropriate circuitry in any desired combination to provide a device capable of treating the appropriate chamber(s) with cardioversion, defibrillation and pacing stimulation.

The stimulation device 10 includes a housing 40 which is often referred to as "can", "case" or "case electrode", and which may be programmably selected to act as the return electrode for all "unipolar" modes. The housing 40 may further be used as a return electrode alone or in combination with one or more of the coil electrodes 28, 36, or 38, for defibrillation shocking purposes. The housing 40 further includes a connector having a plurality of terminals 42, 43, 44, 45, 46, 48, 52, 54, 56, and 58 (shown schematically and, for convenience, the names of the electrodes to which they are connected are shown next to the corresponding terminals). As such, to achieve right atrial sensing and stimulation, the connector includes at least a right atrial tip terminal ($A_R$ TIP) 42 adapted for connection to the atrial tip electrode 22. The connector may also include a right atrial ring terminal ($A_R$ RING) 43 for connection to the right atrial ring electrode 23.

To achieve left chamber sensing, pacing, and shocking, the connector includes at least a left ventricular tip terminal ($V_L$ TIP) 44, a left ventricular ring terminal ($V_L$ RING) 45, a left atrial ring terminal ($A_L$ RING) 46, and a left atrial shocking coil terminal ($A_L$ COIL) 48, which are adapted for connection to the left ventricular tip electrode 26, the left ventricular ring electrode 25, the left atrial ring electrode 27, and the left atrial coil electrode 28, respectively.

To support right ventricular sensing, pacing and shocking, the connector further includes a right ventricular tip terminal ($V_R$ TIP) 52, a right ventricular ring terminal ($V_R$ RING) 54, a right ventricular shocking coil terminal (RV COIL) 56, and an SVC shocking coil terminal (SVC COIL) 58, which are adapted for connection to the right ventricular tip electrode 32, right ventricular ring electrode 34, the RV coil electrode 36, and the SVC coil electrode 38, respectively.

At the core of the stimulation device 10 is a programmable microcontroller 60 that controls the various modes of stimulation therapy. The microcontroller 60 typically includes a microprocessor, or equivalent control circuitry, designed specifically for controlling the delivery of stimulation therapy, and may further include RAM or ROM memory, logic and timing circuitry, state machine circuitry, and I/O circuitry. Typically, the microcontroller 60 includes the ability to process or monitor input signals (data) as controlled by a program code stored in a designated block of memory.

FIG. 2 illustrates an atrial pulse generator 70 and a ventricular pulse generator 72 that generate stimulation pulses for delivery by the right atrial lead 20, the right ventricular lead 30, and/or the coronary sinus lead 24 via a switch 74. It is understood that in order to provide stimulation therapy in each of the four chambers of the heart, the atrial pulse generator 70 and the ventricular pulse generator 72 may include dedicated, independent pulse generators, multiplexed pulse generators, or shared pulse generators. The atrial pulse generator 70 and the ventricular pulse generator 72 are controlled by the microcontroller 60 via appropriate control signals 76 and 78, respectively, to trigger or inhibit the stimulation pulses.

The microcontroller 60 further includes timing control circuitry 79 which is used to control the timing of such stimulation pulses (e.g. pacing rate, atrio-ventricular (AV) delay, atrial interchamber (A—A) delay, or ventricular interchamber (V—V) delay, etc.), as well as to keep track of the timing of refractory periods, noise detection windows, evoked response windows, alert intervals, marker channel timing, etc.

The switch 74 includes a plurality of switches for connecting the desired electrodes to the appropriate I/O circuits, thereby providing complete electrode programmability. Accordingly, the switch 74, in response to a control signal 80 from the microcontroller 60, determines the polarity of the stimulation pulses (e.g. unipolar, bipolar, cross-chamber, etc.) by selectively closing the appropriate combination of switches. Atrial sensing circuits 82 and ventricular sensing circuits 84 may also be selectively coupled to the right atrial lead 20, coronary sinus lead 24, and the right ventricular lead 30, through the switch 74, for it detecting the presence of cardiac activity in each of the four chambers of the heart.

Accordingly, the atrial and ventricular sensing circuits 82 and 84 may include dedicated sense amplifiers, multiplexed amplifiers, or shared amplifiers. The switch 74 determines the "sensing polarity" of the cardiac signal by selectively closing the appropriate switches. In this way, the clinician may program the sensing polarity independent of the stimulation polarity.

Each of the atrial sensing circuit 82 or the ventricular sensing circuit 84 preferably employs one or more low power, precision amplifiers with programmable gain and automatic gain or sensitivity control, bandpass filtering, and a threshold detection circuit, to selectively sense the cardiac signal of interest. The automatic sensitivity control enables the stimulation device 10 to deal effectively with the difficult problem of sensing the low amplitude signal characteristics of atrial or ventricular fibrillation The outputs of the atrial and ventricular sensing circuits 82 and 84 are connected to the microcontroller 60 for triggering or inhibiting the atrial and ventricular pulse generators 70 and 72, respectively, in a demand fashion, in response to the absence or presence of cardiac activity, respectively, in the appropriate chambers of the heart. The atrial and ventricular sensing circuits 82 and 84, in turn, receive control signals over signal lines 86 and 88 from the microcontroller 60, for controlling the gain, threshold, polarization charge removal circuitry, and the timing of any blocking circuitry coupled to the inputs of the atrial and ventricular sensing circuits 82 and 84.

For arrhythmia detection, the stimulation device 10 includes an arrhythmia detector 77 that utilizes the atrial and ventricular sensing circuits 82 and 84 to sense cardiac signals, for determining whether a rhythm is physiologic or pathologic. As used herein "sensing" refers to the process of noting an electrical signal. "Detection" refers to the step of confirming that the sensed electrical signal as the signal being sought by the detector. As an example, "detection" applies to the detection of both proper rhythms (i.e., "R wave" or "R wave") as well as improper dysrhythmias including arrhythmia and bradycardia (e.g., detection of the absence of a proper rhythm.)

The timing intervals between sensed events (e.g. P-waves, R-waves, and depolarization signals associated with fibrillation which are sometimes referred to as "F-waves" or "Fib-waves") are then classified by the arrhythmia detector 77 by comparing them to a predefined rate zone limit (e.g. bradycardia, normal, low rate ventricular tachycardia, high rate ventricular tachycardia, and fibrillation rate zones) and various other characteristics (e.g. sudden onset, stability, physiologic sensors, and morphology, etc.), in order to determine the type of remedial therapy that is needed (e.g. bradycardia pacing, anti-tachycardia stimulation, cardioversion shocks or defibrillation shocks, collectively referred to as "tiered therapy").

Cardiac signals are also applied to the inputs of a data acquisition system 90, which is depicted as an analog-to-digital (A/D) converter for simplicity of illustration. The data acquisition system 90 is configured to acquire intracardiac electrogram (EGM) signals, convert the raw analog data into digital signals, and store the digital signals for later processing and/or telemetric transmission to an external device 102. The data acquisition system 90 is coupled to the right atrial lead 20, the coronary sinus lead 24, and the right ventricular lead 30 through the switch 74 to sample cardiac signals across any pair of desired electrodes.

Advantageously, the data acquisition system 90 may be coupled to the microcontroller 60 or another detection circuitry, for detecting an evoked response from the heart 12 in response to an applied stimulus, thereby aiding in the detection of "capture". In the embodiment shown in FIG. 2, the microcontroller 60 includes an automatic capture detector 65 that searches for an evoked response signal following a stimulation pulse during a "detection window" set by timing control circuitry 79. The microcontroller 60 enables the data acquisition system 90 via control signal 92 to sample the cardiac signal that falls in the capture detection window. The sampled signal is evaluated by automatic capture detector 65 to determine if it is an evoked response signal based on its amplitude, peak slope, morphology or another signal feature or combination of features. The detection of an evoked response during the detection window indicates that capture has occurred.

The microcontroller 60 is further coupled to a memory 94 by a suitable data/address bus 96, wherein the programmable operating parameters used by the microcontroller 60 are stored and modified, as required, in order to customize the operation of the stimulation device 10 to suit the needs of a particular patent. Such operating parameters define, for example, stimulation pulse amplitude, pulse duration, electrode polarity, rate, sensitivity, automatic features, arrhythmia detection criteria, and the amplitude, waveshape and vector of each stimulation pulse to be delivered to the patient's heart 12 within each respective tier of therapy.

The stimulation device 10 additionally includes a power source that is illustrated as a battery 110 that provides operating power to all the circuits shown in FIG. 2. For the stimulation device 10, which employs shocking therapy, the battery 110 must be capable of operating at low current drains for long periods of time, preferably less than 10 μA, and also be capable of providing high-current pulses when the patent requires a shock pulse, preferably, in excess of 2 A, at voltages above 2 V, for periods of 10 seconds or more.

The battery 110 preferably has a predictable discharge characteristic so that elective replacement time can be detected. In accordance with the present invention, the battery 110 includes at least two cells. A preferred embodiment of the power source and method for use will be described in greater detail in conjunction with FIGS. 3 and 4.

A patient warning signal generator 64 is included in the microcontroller 60 such that a patient may be alerted to a condition that requires medical attention. A condition warranting a patient alarm may be related to the device 10 operation or may be related to a detected patient condition. For example, patient warning systems have been proposed for alerting a patient to a detected tachycardia and impending stimulation therapy delivery.

In accordance with one embodiment of the present invention, the patient warning generator 64 is used to alert the patient to a low battery condition as will be described herein. Exemplary patient warning signals include a twitch sensation caused by delivery of a stimulation pulse or burst of pulses delivered to excitable tissue, or an audible warning sound.

As further illustrated in FIG. 2, the stimulation device 10 is shown to include an impedance measuring circuit 112 which is enabled by the microcontroller 60 by control signal 114. The known uses for an impedance measuring circuit 112 include, but are not limited to, lead impedance surveillance during the acute and chronic phases for proper lead positioning or dislodgment; detecting operable electrodes and automatically switching to an operable pair if dislodgment occurs; measuring respiration or minute ventilation; measuring thoracic impedance for determining shock thresholds; detecting when the device has been implanted; measuring stroke volume; and detecting the opening of heart valves, etc. The impedance measuring circuit 112 is advantageously coupled to the switch 74 so that any desired electrode may be used.

Since stimulation device 10 is also intended to operate as an implantable cardioverter/defibrillator (ICD) device, it must detect the occurrence of an arrhythmia, and automatically apply an appropriate electrical stimulation or shock therapy to the heart aimed at terminating the detected arrhythmia. To this end, the microcontroller 60 further controls a shocking circuit 116 by way of a control signal 118.

The shocking circuit 116 generates shocking pulses of low (up to 0.5 joules), moderate (0.5–10 joules), or high (11 to 40 joules) energy, as controlled by the microcontroller 60. Such shocking pulses are applied to the patient's heart through at least two shocking electrodes, and as shown in this embodiment, selected from the left atrial coil electrode 28, the RV coil electrode 36, and/or the SVC coil electrode 38 (FIG. 1). As noted earlier, the housing 40 may act as an active electrode in combination with the RV electrode 36, or as part of a split electrical vector using the SVC coil electrode 38 or the left atrial coil electrode 28.

Cardioversion shocks are generally considered to be of low to moderate energy level (so as to minimize pain felt by the patient), and/or synchronized with an R-wave and/or pertaining to the treatment of tachycardia. Defibrillation shocks are generally of moderate to high energy level (i.e., corresponding to thresholds in the range of 5–40 joules), delivered asynchronously (since R-waves may be too disorganized), and pertaining exclusively to the treatment of fibrillation. Accordingly, the microcontroller 60 is capable of controlling the synchronous or asynchronous delivery of the shocking pulses.

The concept of the present invention is preferably applied in an implantable medical device, such as the implantable cardioverter defibrillator of FIG. 2, possessing a multiple cell power supply in which one or more cells may become depleted prior to other cells. Preferably, the concept is applied to a multiple cell battery that uses at least one high energy density cell to "trickle charge" a lower energy density cell, such as described in U.S. patent application Ser. No. 09/545,044, supra.

Figure 3:
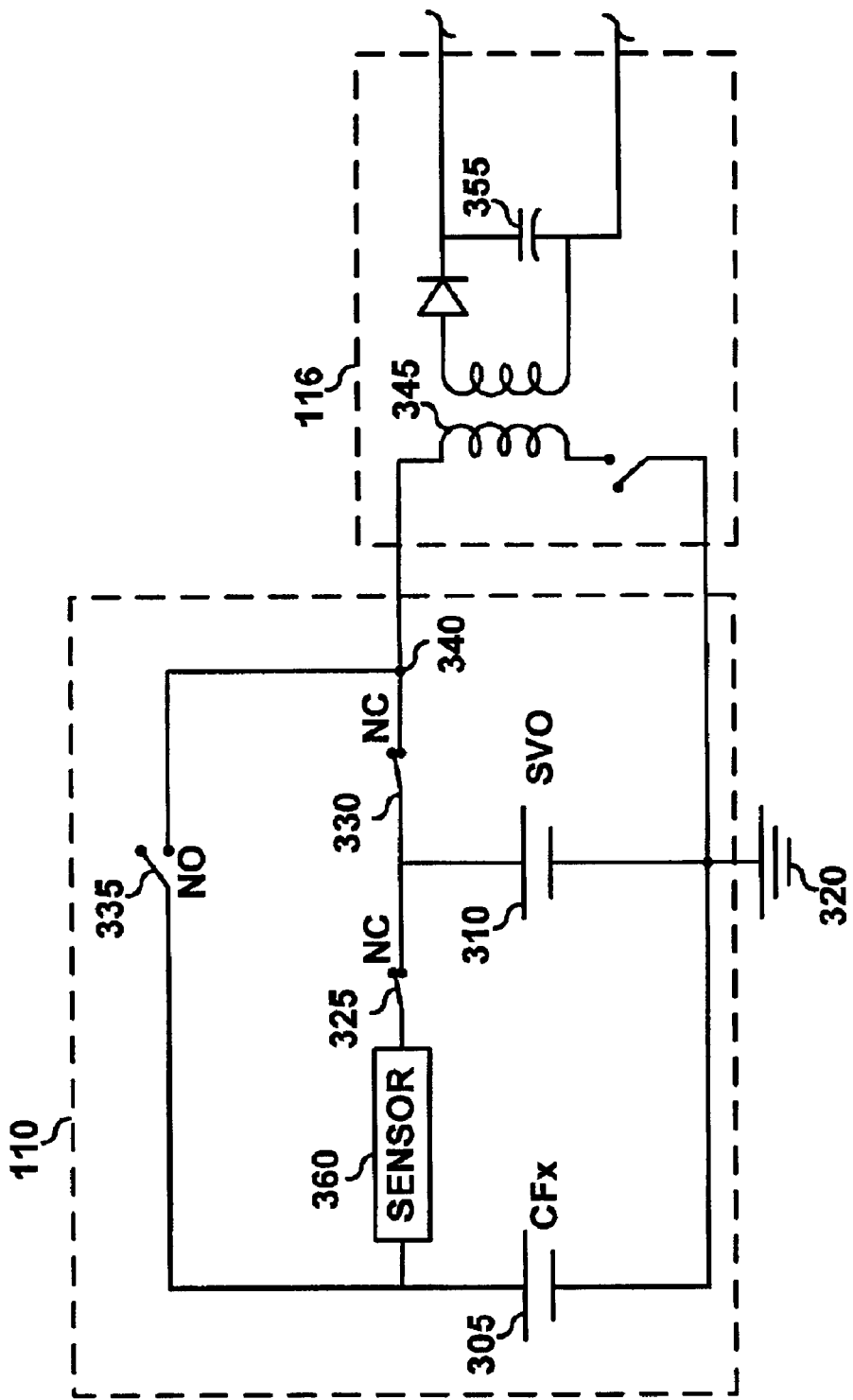
FIG. 3 is a schematic diagram of a switchable power supply circuitry used in the stimulation device of FIG. 2, according to the present invention.

In FIG. 3 a schematic drawing is shown illustrating a preferred embodiment of a "switchable" multiple cell battery 110 included in the present invention. The battery 110 includes a first or "dense" cell 305 and a second or "fast" cell 310 connected in parallel between a ground node 320 and an output node 340, with the battery cell cathodes connected to the ground node 320 and the anodes connected to the output node 340. The ground node 320 is an artificial voltage reference within the ICD and is only weakly connected electrically to the device housing 40, which serves as the device 10 ground and is thus in electrical contact with the patients body in whom device 10 is implanted. This weak connection is to allow for better amplifier noise rejection during sensing but to also allow the housing to be used as a high voltage electrode.

The fast cell 310 provides the current flow needed for charging a capacitor 355 for high voltage stimulation therapies. The voltage of the dense cell 305 is preferably slightly greater than the voltage of the fast cell 310. This small voltage difference allows a safe level of current to flow from the dense cell 305 to the fast cell 310. The dense cell 305 thus acts to recharge the fast cell 310. This continuous "trickle charge" maintains the cell 310 charge needed for high voltage device 10 operations. For additional details regarding the operation of this type of battery cell arrangement, reference is made to U.S. patent application Ser. No. 09/545,044, supra.

In accordance with the present invention, the battery 110 is further equipped with a bank of switches 325, 330, and 335. Switch 325 is connected between the anode of the dense cell 305 and the anode of the fast cell 310. Switch 325 is normally closed (NC) during standard device 10 operation to allow current to flow from the dense cell 305 to the fast cell 310. Switch 330 is connected between the anode of cell 310 and the output node 340. Switch 330 is normally closed (NC) to allow current to flow from the fast cell 310 to the output node 340 during standard device 10 operation.

The output node 340 is shown in FIG. 3 to be further connected to the shocking circuit 116, which, as shown in FIG. 2, is further connected to the electrode configuration switch 74 such that high-voltage stimulation pulses may be delivered to the heart 12. A preferred shocking circuit 116 includes a DC-to-DC voltage converter 345 that is connected to a capacitor 355, which may also be a set of capacitors. The DC to DC converter uses the low voltage (but high current) from the battery to magnetically charge (magnetize) a small transformer. When the transformer is fully magnetized then the switch, which delivered the current is opened. The energy stored in the transformer now has nowhere to go but as a high voltage but low current pulse into the shocking capacitors. The fast cell 310 delivers the necessary current to charge the capacitor 355 for delivering high-voltage stimulation therapies. The fast cell 310 is then recharged or "topped off" by current flowing from the dense cell 305.

The switch 335 is connected between the anode of the dense cell 305 and the output node 340. The switch 335 is normally open (NO) so that the fast cell 310 substantially provides the output current supporting the device functions during normal device function. However, should the fast cell 310 begin depleting prematurely, switch 335 may be closed to allow current to flow from the dense cell 305 to the output node 340 to continue powering the device functions. In this situation, the fast cell 310 is electrically disconnected from the output node 340 by opening the switch 330 and further disconnected from the dense cell 305 by opening the switch 325.

If the dense cell 305 begins depleting prematurely, the switch 335 remains open and the switch 325 is opened by microcontroller 60 such that the dense cell 305 is electrically disconnected from the fast cell 310 and the output node 340. In this case, the switch 330 remains closed to allow current to flow from the fast cell 310 to output node 340 to continue powering the device 10 circuitry. The fast cell 310 will no longer be recharged by the dense cell 305; however the remaining charge of the fast cell 310 is expected to be adequate to power the device 10 functions for a period of time.

In order to detect when a cell is depleting prematurely, a current sensing device 360 is provided between the battery cells 305 and 310. The current sensing device 360 may be a Hall effect sensor or a low-value resistor. The current sensing device 360 enables the microcontroller 60 to detect a signal representing the current flow between the dense cell 305 and the fast cell 310. If the current is found to be outside a predefined, normal operating range, one cell is determined to be discharging prematurely. For clarity of illustration, the control lines from the sensor and to the switches are not shown in the drawings.

If the current flow becomes less than zero, that is flowing in reverse from the fast cell 310 to the dense cell 305, then the dense cell 305 has become depleted. The dense cell 305 is eliminated from the battery network by opening and closing the appropriate switches 325, 330 and 335 as previously described.

If, however, the current flow is found to be greater than a maximum acceptable level, for example greater than 100 microamperes, then the fast cell 310 has is becoming depleted and is drawing a higher than acceptable current from the dense cell 305. Microcontroller 60 then eliminates the fast cell 310 from the battery network by opening or closing the appropriate switches 325, 330, and 335 as described above.

As described herein, the concept of cell depletion is being used in a general sense. Specifically, if one cell develops an internal leakage then it may "lean" on the good cell and parasitically take enough of a maintenance charge so that it does not actually become "depleted." In such a case, the cell voltage would not, in fact, register a malfunction, as the defective cell is being supported by the charged cell. Hence, the importance of the current sensor to detect this problem. As used herein, the term "failure" refers to any of depletion, defect, or leakage.

Figure 4:
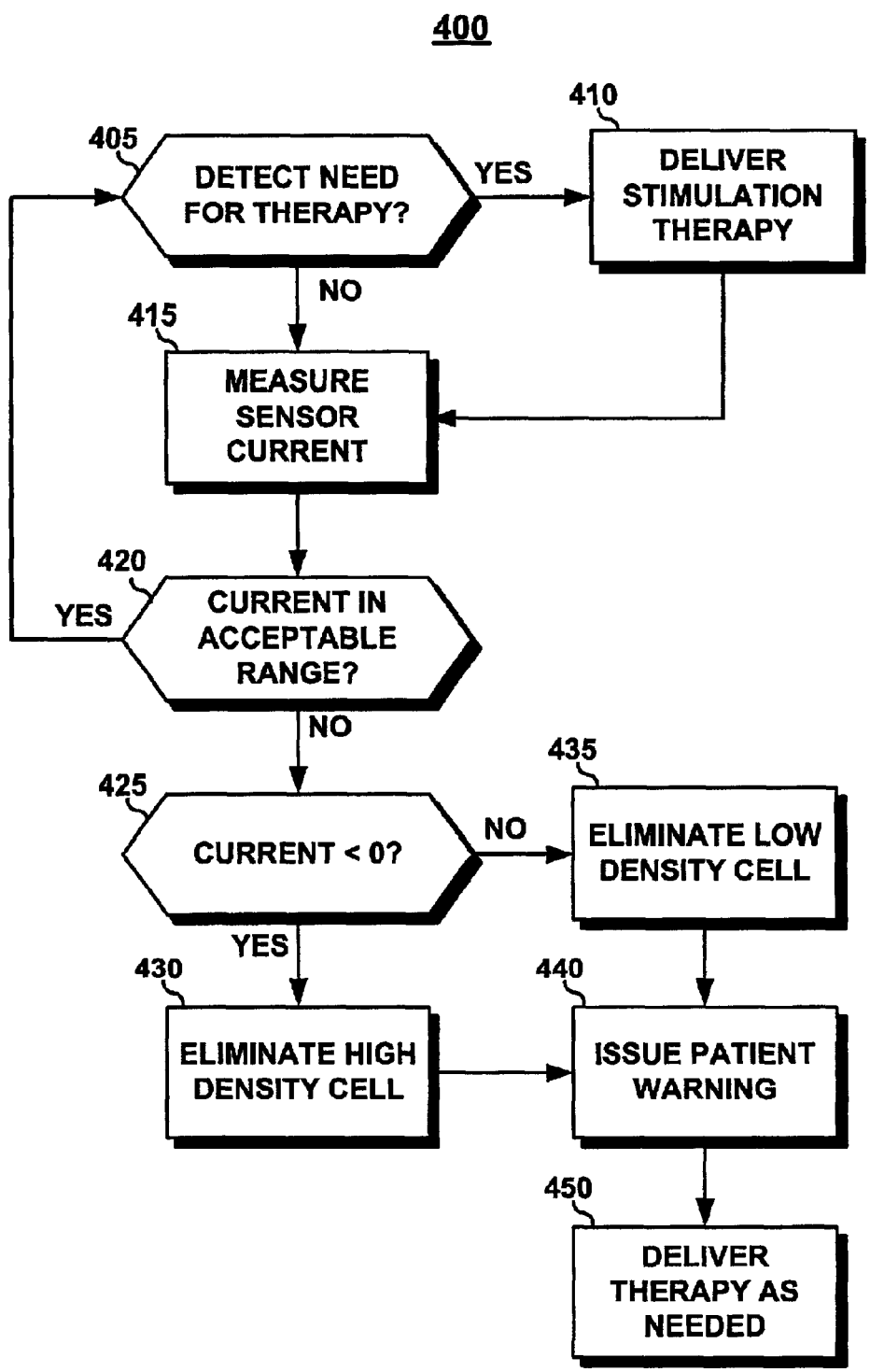
FIG. 4 is a flow chart providing an overview of the operations included in one embodiment of the present invention for using the switchable power supply circuitry of FIG. 3.

In FIG. 4, a flow chart is shown describing a method 400 of using a switchable power supply as implemented in the embodiment of the device 10 shown in FIG. 3. In this flow chart, the various algorithmic steps are summarized in individual "blocks". Such blocks describe specific actions or decisions that must be made or carried out as the algorithm proceeds. Where a microcontroller (or equivalent) is employed, the flow charts presented herein provide the basis for a "control program" that may be used by such a microcontroller (or equivalent) to effectuate the desired control of the stimulation device. Those skilled in the art may readily write such a control program based on the flow chart of FIG. 4 and other descriptions presented herein.

The first block 405 of method 400 represents the normal operation of device 10 wherein heart signals are monitored in order to detect a need for stimulation therapy. If such a need for therapy is detected, stimulation is delivered at step 410.

At times when stimulation therapy is not being delivered, specifically not during or just after capacitor 355 charging, microcontroller 60 monitors the current sensing device 360 at step 415 to determine if the current flow between the dense cell 305 and the fast cell 310 is within an acceptable range. If the current is acceptable, the device 10 continues to operate normally by returning to block 405. Current monitoring is preferably not performed during, or shortly after capacitor 355 charges, because the current from the dense cell 305 to the fast cell 310 will be temporarily high during these times.

If the current is detected to be outside the acceptable range, as determined at decision step 420, the microcontroller further determines if the current is less than zero at decision step 425. If so, the dense cell 305 is determined to have discharged beyond a functional level resulting in current flowing from the fast cell 310 to the dense cell 305. The dense cell 305 is thus eliminated from the battery network at step 430 by opening or closing the appropriate switches 325, 330, and 335 (FIG. 3) as previously described.

If, however, the current flow is found, at decision step 420, to be outside of the acceptable range and greater than zero as determined at decision step 325, then the fast cell 310 is determined to have discharged beyond a functional level. As stated earlier, in the event of an internal leakage, this determination will be made before the actual depletion occurs. The current flow recharging the fast cell 310 has become unacceptably high. The fast cell 310 is thus eliminated from the battery network at step 435 by opening or closing the appropriate switches 325, 330 and 335 (FIG. 3), as previously described.

If either the dense cell 305 is eliminated at step 430 or the fast cell 310 is eliminated at step 435, the microcontroller 60 issues a patient warning at step 440. The patient warning is preferably an audible sound or a perceivable "twitch" stimulation issued by the patient warning generator 64. The patient should be advised to seek immediate medical attention upon awareness of the patient warning signal. Any known or available patient warning method for use in an implantable device could be used in the present invention. Preferably, the method uses a minimal amount of battery charge since the power supply is now functioning at a reduced level.

After issuing a patient warning, the device 10 continues to function according to normal operating parameters at block 450. The remaining battery cell will be adequate to support device function for a period of time, allowing the patient to seek medical attention.

Thus, a system and method for using a multiple cell power supply in an implantable medical device has been described in which switching circuitry is used to eliminate depleted cells, and a patient warning signal is issued. While detailed descriptions of specific embodiments of the present invention have been provided, it would be apparent to those reasonably skilled in the art that numerous variations of the methods described herein are possible in which the concepts of the present invention may readily be applied. The descriptions provided herein are for the sake of illustration and are not intended to be exclusive.

What is claimed is:

1. A method of using a multiple cell power supply in an implantable cardiac stimulation device, comprising:
   connecting a fast battery cell to an output node to power stimulation device functions;
   connecting the fast battery cell to a dense battery cell having a greater power capacity than the fast battery cell, so that the dense battery cell is capable of recharging the fast battery cell upon demand;

detecting if the fast battery cell or dense battery cell becomes a failing battery cell;

electrically disconnecting the failing battery cell from the other battery cell and from the output node;

allowing the other battery cell to replace the failing battery cell in powering the stimulation device functions; and providing a warning signal upon disconnection of the failing battery cell.

2. The method according to claim 1, wherein the fast battery cell and the output node are connected by a fast intervening switch that is normally closed, so that the fast battery cell substantially provides the energy required by the output node.

3. The method according to claim 2, wherein the fast battery cell and the dense battery cell are connected by a dense intervening switch that is normally closed, so that as energy is drawn from the fast battery cell by the output node, the fast battery cell is recharged by current flowing from the dense battery cell.

4. The method according to claim 3, wherein the dense battery cell and the output node are connected by a third intervening switch that is normally open.

5. The method according to claim 4, wherein detecting the failing of a battery cell comprises monitoring a current sensor that is positioned between the fast battery cell and the dense battery cell, so that a signal proportional to the current flow from the dense cell to the fast cell may be measured.

6. The method according to claim 5, wherein the current sensor is a Hall effect sensor.

7. The method according to claim 5, wherein the current sensor is a low-level resistor.

8. The method according to claim 5, wherein detecting the failing of the dense battery cell comprises detecting when a current between the fast battery cell and the dense battery cell approaches a predetermined limit.

9. The method according to claim 8, wherein disconnecting the dense battery cell comprises opening the dense intervening switch between the fast and dense battery cells.

10. The method according to claim 9, wherein detecting the failing of the fast battery cell comprises detecting when a current between the fast battery cell and the dense battery cell is greater than a predetermined maximum acceptable level.

11. The method according to claim 10, wherein disconnecting the fast battery cell comprises opening the fast intervening switch between the fast battery cell and the output node and opening the dense intervening switch between the fast battery cell and the dense battery cell.

12. The method according to claim 11, further comprising connecting the dense battery cell to the output node by closing the third intervening switch between the dense cell and the output node, so that the dense battery cell powers the stimulation device functions.

13. The method according to claim 12, wherein providing the warning signal comprises delivering a patient alarm upon disconnecting the failing battery cell by delivering an electrical stimulation to an excitable tissue, causing a sensation that is perceivable by the patient.

14. The method according to claim 12, wherein providing a warning signal comprises delivering an audible sound.

15. The method according to claim 1, wherein the fast battery cell is a lithium silver vanadium oxide cell.

16. The method according to claim 1, wherein the dense battery cell is a lithium carbon monofluoride cell.

17. The method according to claim 1, wherein the implantable medical device is an implantable defibrillator.

18. An implantable cardiac stimulation device capable of using a multiple cell power supply, the device comprising:

a fast battery cell connected to an output node to power stimulation device functions, and to a dense battery cell having a greater power capacity than the fast battery cell, so that the dense battery cell is capable of recharging the fast battery cell upon demand;

a sensor that detects if the fast battery cell or dense battery cell becomes a failing battery cell;

a switch that electrically disconnects the failing battery cell from the other battery cell and from the output node, and that further connects the other battery cell to the output node; and a warning mechanism that provides a warning signal based on detection of the failing battery cell.

19. The stimulation device according to claim 18, wherein the fast battery cell and the output node are connected by a fast intervening switch that is normally closed, so that the fast battery cell substantially provides the energy required by the output node.

20. The stimulation device according to claim 19, wherein the fast battery cell and the dense battery cell are connected by a dense intervening switch that is normally closed, so that as energy is drawn from the fast battery cell by the output node, the fast battery cell is recharged by current flowing from the dense battery cell.

21. The stimulation device according to claim 20, wherein the dense battery cell and the output node are connected by a third intervening switch that is normally open.

22. The stimulation device according to claim 21, wherein the sensor is a current sensor that detects the failing battery cell by measuring a signal proportional to a current flow from the dense cell to the fast cell.

23. The stimulation device according to claim 21, wherein the sensor is a current sensor that detects the failing battery cell by detecting when a current between the fast battery cell and the dense battery cell approaches a predetermined limit.

24. The stimulation device according to claim 21, wherein the sensor is a current sensor that detects the failing of the fast battery cell by detecting when a current between the fast battery cell and the dense battery cell is greater than a predetermined maximum acceptable level.

25. An implantable cardiac stimulation device capable of using a multiple cell power supply, the device comprising:

a fast energy storage means connected to an output node to power stimulation device functions, and to a dense energy storage means having a greater power capacity than the fast energy storage means, so that the dense energy storage means is capable of recharging the fast energy storage means upon demand;

sensing means for detecting a failing energy storage means;

means for electrically disconnecting the failing energy storage means from a non failing energy storage means and from the output node, and for allowing the non failing energy storage means to replace the failing energy storage means in powering the stimulation device functions; and means for providing a warning signal upon disconnection of the failing energy storage means.

26. The stimulation device according to claim 25, wherein the fast energy storage means and the output node are connected by a switching means so that the fast energy storage means substantially provides the energy required by the output node.

27. The stimulation device according to claim 26, wherein the fast energy storage means and the dense energy storage means are connected by the switching means, so that as energy is drawn from the fast energy storage means by the output node, the fast energy storage means is recharged by current flowing from the dense energy storage means.

28. The stimulation device according to claim 27, wherein the sensing means detects the failing energy storage means by measuring a signal proportional to a current flow from the dense cell to the fast cell.

29. The stimulation device according to claim 27, wherein the sensing means detects the failing energy storage means by detecting when a current between the fast energy storage means and the dense energy storage means approaches a predetermined limit.

30. The stimulation device according to claim 27, wherein the sensing means detects the failing of the fast energy storage means by detecting when a current between the fast energy storage means and the dense energy storage means is greater than a predetermined maximum acceptable level.

31. A method of using a multiple cell power supply in an implantable cardiac stimulation device, comprising:

connecting a first battery cell to an output node to provide power for stimulation device functions;

connecting the first battery cell to a second battery cell so that the second battery cell is capable of recharging the first battery cell upon demand;

detecting if the first or second battery cell becomes a failing battery cell;

electrically disconnecting the failing battery cell;

if the other battery cell is not connected to the output node, connecting the other battery cell to the output node; and providing a warning signal after detecting the failing battery cell.

* * * * *